United States Patent [19]
Kinugasa et al.

[11] Patent Number: 5,979,157
[45] Date of Patent: Nov. 9, 1999

[54] METHOD AND A DEVICE FOR PURIFYING EXHAUST GAS OF AN INTERNAL COMBUSTION ENGINE

[75] Inventors: Yukio Kinugasa, Susono; Takaaki Itou, Mishima; Koichi Hoshi; Koichi Takeuchi, both of Susono, all of Japan

[73] Assignee: Toyota Jidosha Kabushiki Kaisha, Aichi-Ken, Japan

[21] Appl. No.: 08/911,532

[22] Filed: Aug. 14, 1997

[30] Foreign Application Priority Data

Aug. 15, 1996 [JP] Japan .................................... 8-215737

[51] Int. Cl.[6] ...................................................... F01N 3/00
[52] U.S. Cl. ................................ 60/274; 60/288; 60/289; 60/297; 60/285; 60/307
[58] Field of Search ............................. 60/274, 288, 289, 60/297, 307, 285

[56] References Cited

U.S. PATENT DOCUMENTS

| 4,199,938 | 4/1980 | Nakase et al. | |
| 5,584,177 | 12/1996 | Oketani et al. | 60/289 |
| 5,655,362 | 8/1997 | Kawajiri et al. | 60/285 |
| 5,662,869 | 9/1997 | Abe et al. | 60/297 |
| 5,787,707 | 8/1998 | Hertl et al. | 60/297 |

FOREIGN PATENT DOCUMENTS

| 0602963 | 6/1994 | European Pat. Off. . |
| 0661098 | 7/1995 | European Pat. Off. . |
| 63-68713 | 3/1988 | Japan . |
| 5-79319 | 3/1993 | Japan . |
| 5-149130 | 6/1993 | Japan . |
| 5-321646 | 12/1993 | Japan . |
| 5-321648 | 12/1993 | Japan . |
| 6-200736 | 7/1994 | Japan . |

OTHER PUBLICATIONS

Patent Abstracts of Japan, vol. 095, No. 007, Aug. 31, 1995 & JP 07 102957 A (Babcock Hitachi KK), Apr. 18, 1995.
Patent Abstracts of Japan, vol. 017, No. 572 (M–1497), Oct. 18, 1993 & JP 05 163941 A (Mazda Motor Corp), Jun. 29, 1993.
Patent Abstracts of Japan, vol. 013, No. 244 (M–834), Jun. 7, 1989 & JP 01 053046 A (Mitsubishi Motors Corp; Others: 01), Mar. 1, 1989.
Patent Abstracts of Japan, vol. 096, No. 010, Oct. 31, 1996 & JP 08 150322 A (Toyota Motor Corp), Jun. 11, 1996.

Primary Examiner—Thomas E. Denion
Attorney, Agent, or Firm—Kenyon & Kenyon

[57] ABSTRACT

A device for purifying exhaust gas includes an HC adsorbent and an exhaust gas purifying catalyst disposed in an exhaust gas passage in this order from the upstream side. The exhaust gas purifying catalyst is provided with an $O_2$ storage capability, i.e., the exhaust gas purifying catalyst is capable of absorbing oxygen in the exhaust gas when the air-fuel ratio of the exhaust gas is lean, and is capable of releasing the absorbed oxygen when the air-fuel ratio of the exhaust gas becomes rich. When the engine starts, the HC adsorbent adsorbs HC in the exhaust gas. When the temperature of the exhaust gas becomes high, the HC adsorbent releases the adsorbed HC. The device also includes an engine control unit which operates the engine at a lean air-fuel ratio during a predetermined period before the releasing of the HC from the HC adsorbent occurs. Therefore, oxygen is absorbed and stored in the exhaust gas purifying catalyst before the releasing of HC occurs. When the releasing of HC from the HC adsorbent occurs, the air-fuel ratio of the exhaust gas flowing into the exhaust gas purifying catalyst becomes rich due to the HC released from the HC adsorbent. This causes the exhaust gas purifying catalyst to release the absorbed oxygen, and the HC in the exhaust gas is purified by the exhaust gas purifying catalyst using the released oxygen.

18 Claims, 11 Drawing Sheets

METHOD AND A DEVICE FOR PURIFYING EXHAUST GAS OF AN INTERNAL COMBUSTION ENGINE

BACKGROUND OF THE INVENTION

1. Field of the Invention

The present invention relates to a method and a device for purifying an exhaust gas of an internal combustion engine. More specifically, the invention relates to a method and a device which are capable of efficiently purifying hydrocarbon in the exhaust gas released from the engine during a starting up period.

2. Description of the Related Art

An exhaust gas purification device utilizing a three-way reducing and oxidizing catalyst (hereinafter referred to as a "three-way catalyst") is commonly used for purifying HC, CO and $NO_x$ from the exhaust gas of an internal combustion engine. However, a three-way catalyst is capable of purifying HC, CO and $NO_x$ only when the temperature of the catalyst becomes higher than a activating temperature (for example, about 300° C.). Therefore, when the temperature of the three-way catalyst is low, such as in the starting up period of the engine, HC and CO in the exhaust gas pass through the three-way catalyst without being purified. Further, since the amount of fuel supplied to the engine is increased during the starting operation in order to facilitate the engine start, a relatively large amount of HC (unburned hydrocarbons) is contained in the exhaust gas in the period immediately after the engine has started compared to that during a normal operation. Also, since the amount of the fuel supplied to the engine during a starting operation is increased as the temperature of the engine is lower, a large amount of HC is released during a cold starting of the engine. This large amount of HC is released to atmosphere without being purified by the three-way catalyst since the three-way catalyst does not reach the activating temperature during cold starting of the engine. Therefore, it is necessary to purify HC in the exhaust gas during a starting operation of the engine in order to reduce air pollution due to engine exhaust gases.

To solve this problem, for example, Japanese Unexamined Patent Publication (Kokai) No. 5-79319 discloses an exhaust gas purifying device which utilizes an HC adsorbent for adsorbing and temporarily storing hydrocarbons released from the engine during starting operation. The device in the '319 publication disposes an HC adsorbent in the exhaust gas passage of the engine. The HC adsorbent adsorbs hydrocarbons in the exhaust gas when the temperature of the adsorbent is lower than a releasing temperature determined by the material of the adsorbent. Further, the HC adsorbent releases the adsorbed hydrocarbons when the temperature becomes higher than the releasing temperature. The device in the '319 publication further includes an electrically heated catalytic converter disposed in the exhaust gas passage downstream of the HC adsorbent. The electrically heated catalytic converter (hereinafter referred to as "an EHC") is a catalytic converter provided with an electric heater which is capable of heating the catalyst in a short time. By energizing the heater at the start of the engine, the catalyst is heated to the activating temperature rapidly. According to the device in the '319 publication, a relatively large amount of the hydrocarbons contained in the low temperature exhaust gas during the starting up period of the engine is adsorbed and temporarily stored in the HC adsorbent. Therefore, during the starting up period of the engine, i.e., when the temperature of the catalyst is lower than the activating temperature, hydrocarbons in the exhaust gas do not pass through the catalytic converter, and hydrocarbons are not released into the atmosphere. When the catalyst in the converter reaches the activating temperature, the catalytic converter starts to oxidize the hydrocarbons in the exhaust gas. Therefore, even if the HC adsorbent is saturated with the adsorbed hydrocarbons after the EHC reaches the activating temperature, hydrocarbons which are not adsorbed by the HC adsorbent and flow into the EHC are purified by the EHC.

However, when the temperature of the HC adsorbent reaches the releasing temperature due to a temperature rise after the engine has started, the hydrocarbons adsorbed and stored in the HC adsorbent are released in a short time, and the concentration of hydrocarbons in the exhaust gas flowing into the EHC largely increases. In this case, the air-fuel ratio of the exhaust gas flowing into the EHC becomes very low due to the hydrocarbons released from the HC adsorbent. In this condition, the EHC cannot oxidize hydrocarbons due to a shortage of oxygen in the exhaust gas. Therefore, the device in the '319 publication disposes a temperature sensor for detecting the temperature of the HC adsorbent bed, and supplies secondary air to the exhaust gas passage between the HC adsorbent and the EHC when the temperature of the HC adsorbent becomes higher than the releasing temperature. Further, the device adjusts the amount of secondary air by a feedback control based on an oxygen concentration sensor disposed in the exhaust gas passage at the inlet of the EHC in order to supply an exact amount of secondary air required for purifying (oxidizing) hydrocarbons in the exhaust gas to the EHC.

Namely, in the device disclosed in the '319 publication, relatively large amounts of hydrocarbons released from the engine during the starting up period are stored in the HC adsorbent, and when the hydrocarbons stored in the HC adsorbent are released due to a temperature rise of the exhaust gas, secondary air is supplied to EHC in order to purify the released hydrocarbons on the EHC.

However, in the device in the '319 publication, a temperature sensor for detecting the HC adsorbent bed temperature is required to determine the timing at which the releasing of hydrocarbons occurs. Further, an oxygen concentration sensor and a feedback control system of secondary air are required to supply a proper amount of air to the EHC because, if an excess amount of air is supplied to the EHC, the fuel consumption of the engine will increase due to the power consumption of an air source such as an air pump in the secondary air system and, if the amount of air is not sufficient, hydrocarbons are not sufficiently purified on the EHC. Therefore, the device in the '319 publication is complicated and the manufacturing cost is relatively high.

Further, since the oxygen concentration in air is only about 20%, a relatively large amount of secondary air must be supplied to the EHC in order to purify all the hydrocarbons released from the HC adsorbent. Therefore, in the device in the '319 publication, the EHC, even after it reaches the activating temperature, may be cooled by a large amount of secondary air to a temperature below the activating temperature and may loose its activity. This lowers the ability of the EHC to purify hydrocarbons in the exhaust gas.

SUMMARY OF THE INVENTION

In view of the problems in the related art as set forth above, the object of the present invention is to provide a method and a device for purifying exhaust gas which are capable of efficiently purifying large amounts of hydrocarbons discharged from an engine during a starting up period, without requiring a complicated control system.

This object is achieved by a method for purifying exhaust gas of an internal combustion engine which includes the steps of providing HC adsorbing means in an exhaust gas passage of an internal combustion engine, wherein the HC adsorbing means adsorbs hydrocarbons in the exhaust gas when the temperature of the HC adsorbing means is lower than a predetermined releasing temperature, and the HC adsorbing means releases the adsorbed hydrocarbons when the temperature of the HC adsorbing means is higher than said releasing temperature, providing exhaust gas purifying means for oxidizing hydrocarbons in the exhaust gas in the exhaust gas passage downstream of the HC adsorbing means, wherein the exhaust gas purifying means is provided with an $O_2$ storage capability which enables the exhaust gas purifying means to absorb oxygen in the exhaust gas flowing into the exhaust gas purifying means when the air-fuel ratio of the exhaust gas is higher than a stoichiometric air-fuel ratio, and to release the absorbed oxygen when the air-fuel ratio of the exhaust gas is lower than the stoichiometric air-fuel ratio, supplying the exhaust gas of the engine to the HC adsorbing means so that the HC adsorbing means adsorbs hydrocarbons in the exhaust gas during a starting up period of the engine in which the exhaust gas temperature is lower than the releasing temperature, and so that the HC adsorbing means releases the adsorbed hydrocarbons when the temperature of the exhaust gas becomes higher than the releasing temperature, causing the exhaust gas purifying means to absorb oxygen before the releasing of hydrocarbons from the HC adsorbing means occurs by supplying exhaust gas having an air-fuel ratio higher than the stoichiometric air-fuel ratio to the exhaust gas purifying means, and supplying the exhaust gas through the HC adsorbing means to the exhaust gas purifying means so that, when the releasing of the adsorbed hydrocarbons from the HC adsorbing means occurs, the air-fuel ratio of the exhaust gas flowing into the exhaust gas purifying means becomes lower than the stoichiometric air-fuel ratio, and thereby the absorbed oxygen is released from the exhaust gas purifying means and reacts with the hydrocarbons in the exhaust gas on the exhaust gas purifying means.

According to another aspect of the present invention, there is provided a device for purifying exhaust gas of an internal combustion engine comprising, an HC adsorbent disposed in an exhaust gas passage of the engine, wherein the HC adsorbent absorbs hydrocarbons in the exhaust gas when the temperature of the adsorbent is lower than a predetermined releasing temperature, and the HC adsorbent releases the absorbed hydrocarbons when the temperature of the adsorbent is higher than the releasing temperature, an exhaust gas purifying catalyst disposed in the exhaust gas passage downstream of the HC adsorbent, wherein the catalyst is provided with an $O_2$ storage capability which enables the catalyst to absorb oxygen in the exhaust gas flowing into the catalyst when the air-fuel ratio of the exhaust gas is higher than a stoichiometric air-fuel ratio, and to release the absorbed oxygen when the air-fuel ratio of the exhaust gas flowing into the catalyst is lower than the stoichiometric air-fuel ratio, $O_2$ storage control means for causing the exhaust gas purifying catalyst to absorb oxygen by adjusting the air-fuel ratio of the exhaust gas flowing into the catalyst at a value higher than a stoichiometric air-fuel ratio, wherein the $O_2$ storage control means causes the catalyst to absorb oxygen before the hydrocarbons adsorbed in the HC adsorbent during a low exhaust gas temperature period following the start of the engine is released due to a temperature rise of the exhaust gas so that, when the hydrocarbons released from the adsorbent flows into the catalyst, the absorbed oxygen is released from the catalyst and reacts with the released hydrocarbons on the catalyst.

In the present invention, an exhaust gas purifying means such as an exhaust gas purifying catalyst having an $O_2$ storage capability is used. In general, an exhaust gas purifying catalyst (for example, a three-way catalyst), which carries a metal component (such as cerium (Ce)) in addition to catalytic component, has an $O_2$ storage capability. The $O_2$ storage capability is a capability for absorbing oxygen in exhaust gas when the air-fuel ratio of exhaust gas is higher than the stoichiometric air-fuel ratio (i.e., a lean air-fuel ratio), and releases the absorbed oxygen when the air-fuel ratio of exhaust gas is lower than the stoichiometric air-fuel ratio (i.e., a rich air-fuel ratio). For example, if a cerium (Ce) is carried by the catalyst in addition to the catalytic component, cerium combines with oxygen in the exhaust gas and forms cerium oxide when the air-fuel ratio of the exhaust gas is lean and oxygen is absorbed (stored) in the exhaust gas purifying catalyst. Further, when the air-fuel ratio of the exhaust gas becomes rich, cerium oxide decomposes to cerium and oxygen and the exhaust gas purifying catalyst releases oxygen. Thus, the exhaust gas purifying catalyst is provided with $O_2$ storage capability due to a metal component such as cerium.

Therefore, when an exhaust gas purifying catalyst having the $O_2$ storage capability has absorbed (stored) a sufficient amount of oxygen, all of hydrocarbons in the exhaust gas flowing into the exhaust gas purifying catalyst can be oxidized by the oxygen released from the exhaust gas purifying catalyst even if the concentration of hydrocarbons in the exhaust gas largely increases in a short time.

However, the devices which dispose an HC adsorbent in the exhaust gas passage upstream of the exhaust gas purifying catalyst to temporarily store hydrocarbons discharged from the engine during the starting up period does not sufficiently utilize the $O_2$ storage capability of the exhaust gas purifying catalyst. In these devices, it is required to store a sufficient amount of oxygen in the exhaust gas purifying catalyst before the releasing of the hydrocarbons from the HC adsorbent occurs. However, the operation for storing a sufficient amount of oxygen in the catalyst was not performed before the releasing of hydrocarbons occurs.

In the present invention, considering the above, an operation for storing a sufficient amount of oxygen in the exhaust gas purifying catalyst is performed before the releasing of hydrocarbons occurs in order to purify the released hydrocarbons using the oxygen stored in the exhaust gas purifying catalyst. Namely, when hydrocarbons are released from the HC adsorbent, the air-fuel ratio of the exhaust gas flowing into the exhaust gas purifying catalyst becomes a rich air-fuel ratio even if the engine is operated at a stoichiometric air-fuel ratio. (In this specification, an air-fuel ratio of the exhaust gas at a certain point in the exhaust gas passage is defined by a ratio of the air and the fuel (hydrocarbons) which are supplied to the combustion chambers or exhaust passages upstream of the point. Therefore, when a large amount of hydrocarbons are released from the HC adsorbent, the air-fuel ratio of the exhaust gas downstream of the HC adsorbent becomes rich even if the air-fuel ratio of the exhaust gas at the outlet of the engine is a stoichiometric air-fuel ratio). Therefore, when the rich air-fuel ratio exhaust gas from the HC adsorbent flows into the exhaust gas purifying catalyst having the $O_2$ storage capability, oxygen absorbed in the catalyst is released. Further, when the air-fuel ratio of the exhaust gas passing through the exhaust gas purifying catalyst becomes the stoichiometric air-fuel ratio due to the released oxygen, the releasing of oxygen from the exhaust gas purifying catalyst automatically stops. This means that, when hydrocarbons are released from the HC adsorbent, an exact amount of oxygen required for oxidizing the hydrocarbons released from the HC adsorbent is automatically released from the exhaust gas purifying catalyst. Therefore, by storing in the exhaust gas purifying catalyst an amount of oxygen sufficient for purifying the hydrocarbons released from the HC adsorbent before the releasing of hydrocarbons from the HC adsorbent occurs, the released hydrocarbons can be efficiently purified without using a complicated control for a secondary air supply system.

The operation for storing oxygen in the exhaust gas purifying catalyst may be carried out at any time before the releasing of the hydrocarbons from the HC adsorbent occurs. For example, the operation for storing oxygen may be carried out during a starting operation of the engine, or it may be carried out during a period from the completion of the engine start to the occurrence of the releasing of hydrocarbons. Further, the operation for storing oxygen may be carried out during stopping of the engine, or after the engine has been stopped. In this case, oxygen stored in the exhaust gas purifying catalyst is used when the engine is next started.

Further, the exhaust gas purifying catalyst may be provided with an electric heater to raise the temperature of the catalyst in a short time. Raising the temperature of the catalyst in a short time, in this case, has two effects. First of all, the temperature of the catalyst rapidly reaches to the activating temperature. Further, it is known that the catalytic component such as a precious metal must be at a high temperature in order to cause cerium oxide to release oxygen. Therefore, by providing the electric heater to the exhaust gas purifying catalyst, the $O_2$ storage capability of the catalyst can be utilized effectively.

BRIEF DESCRIPTION OF THE DRAWINGS

The present invention will be better understood from the description as set forth hereinafter, with reference to the accompanying drawings in which.

DESCRIPTION OF THE PREFERRED EMBODIMENT

Hereinafter, embodiments of the present invention will be explained in detail with reference to the accompanying drawings.

Figure 1:
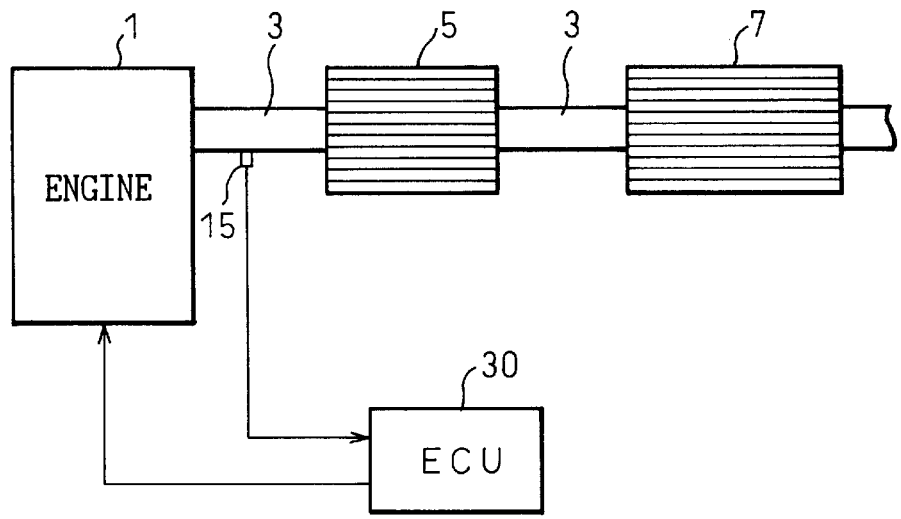
FIG. 1 schematically illustrates the general configuration of an embodiment of the exhaust gas purification device according to the present invention.

FIG. 1 shows a general configuration of an embodiment of the present invention when it is applied to a vehicle engine. In FIG. 1, reference numeral 1 designates an internal combustion engine for an automobile, reference numeral 3 is an exhaust gas passage of the engine 1. In the exhaust gas passage 3, an HC adsorbent 5 and an exhaust gas purifying catalyst 7 having an $O_2$ storage capability are disposed in this order from upstream side. Further, in this embodiment, an air-fuel ratio sensor for detecting the air-fuel ratio of the exhaust gas is disposed in the exhaust gas passage upstream of the HC adsorbent 5. Reference numeral 30 in FIG. 1 is an engine control unit (ECU) which performs basic control of the engine 1 such as a fuel injection control and an engine air-fuel ratio control.

The HC adsorbent 5 in this embodiment is made of material such as a porous adsorbent containing silica ($SiO_2$) as a major component (for example, $SiO_4$ which carries $SiO_2$ between its crystal layer), or a porous material (for example, zeolite such as ZSM-5 and mordenite) formed in a cylindrical shape having numerous narrow exhaust gas passages (cells) along its axis. The shape of the HC adsorbent is almost the same as that of a monolithic substrate normally used for a three-way catalyst. Another type of HC adsorbent which, for example, uses a monolithic substrate made of cordierite with walls of cells coated by an inorganic porous material such as alumina ($Al_2O_3$) and silica ($SiO_2$), may be used in the present invention.

The HC adsorbent performs an adsorbing and releasing operation of unburned hydrocarbons (HC) in which the HC adsorbent adsorbs HC in the exhaust gas into the pores of porous material when the temperature is low, and releases the adsorbed HC when the temperature becomes higher than a releasing temperature (generally, equal to the boiling point of the adsorbed HC).

In general, since the temperature of the exhaust gas is low and does not reach the releasing temperature immediately after the engine is started, a large amount of HC discharged from the engine 1 is adsorbed in the HC adsorbent 5 and the exhaust gas flows out from the HC adsorbent 5 is almost free from HC.

In this embodiment, a three-way catalyst is used as the exhaust gas purifying catalyst 7. The three-way catalyst 7 in this embodiment is a known type which uses, for example, a honeycomb type monolithic substrate made of cordierite. On this substrate, an alumina layer which acts as a carrier of the catalytic components is applied. Precious metal catalytic components such as platinum (Pt), palladium (Pd) and rhodium (Rh) and additives such as cerium (Ce) are attached to this alumina carrier.

As is well known, the three-way catalyst is capable of purifying HC, CO and $NO_x$ in the exhaust gas at a high efficiency when the air-fuel ratio of the exhaust gas is within a narrow range (a window) around the stoichiometric air-fuel ratio.

Further, cerium (Ce) in the exhaust gas purifying catalyst combines with oxygen in the exhaust gas and forms cerium oxide (CeO) in an oxidizing atmosphere (i.e., when the air-fuel ratio of the exhaust gas flowing into the catalyst is lean). Cerium oxide has a tendency to return to cerium (Ce) by releasing oxygen in a reducing atmosphere (i.e., when the air-fuel ratio of the exhaust gas flowing into the catalyst is rich). Therefore, by adding cerium to the exhaust gas purifying catalyst as an additive, the exhaust gas purifying catalyst 7 is provided with the $O_2$ storage capability.

The air-fuel ratio sensor 15 in FIG. 1 is a so-called linear air-fuel ratio sensor which detects the concentration of oxygen in the exhaust gas and outputs a continuous signal which corresponds to the air-fuel ratio of the exhaust gas. Further, the air-fuel ratio sensor 15 in this embodiment is provided with an electric heater in order to activate the sensor shortly after the engine starting operation is commenced. Since the air-fuel ratio sensor is activated immediately after the engine start in this embodiment, the air-fuel ratio of the exhaust gas can be monitored from immediately after the start of the engine.

The engine control unit or ECU 30 in this embodiment comprises, for example, a microcomputer of a known type which has a CPU, a RAM, a ROM, and an input/output interface interconnected by a bi-directional bus. The ECU 30 performs an air-fuel ratio control of the engine 1 in which it controls the fuel injection amount of the engine in accordance with the output of the air-fuel ratio sensor 15. In order to perform this type of control, the air-fuel ratio signal from the sensor 15 is supplied to the input/output interface of the ECU 30. Further, the input/output interface of the ECU 30 is connected the fuel injection valve (not shown) of the respective cylinders of the engine 1 through a fuel injection circuit (not shown) in order to control the amount of fuel injected into the respective cylinders. In this embodiment, the ECU 30 controls the fuel injection amount of the engine in accordance with the engine temperature and the cranking speed of the engine during the starting operation of the engine. During the starting operation, the air-fuel ratio of the engine is controlled at a rich air-fuel ratio in order to facilitate the starting of the engine. Since the condition of the combustion in the engine 1 during the starting operation is bad due to the low temperature of the engine and, further, the air-fuel ratio of the engine is controlled at a rich air-fuel ratio, a large amount of HC is discharged from the engine to the exhaust gas passage 3 and flows into the HC adsorbent 5. However, since the exhaust gas temperature is low during the starting operation, almost all of the HC flows into the HC adsorbent 5 is adsorbed and stored in the HC adsorbent 5 and does not flows out from the HC adsorbent 5.

When the starting operation of the engine completes, i.e., when the engine starts, the ECU 30 controls the air-fuel ratio of the engine at a lean air-fuel ratio (for example, an air-fuel ratio of about 16). In this embodiment, the air-fuel ratio sensor 15 which is activated in a short time is used and the air-fuel ratio of the engine can be feedback controlled based on the output of the sensor 15 from immediately after the start of the engine. By controlling the air-fuel ratio of the engine at a lean air-fuel ratio after the start of the engine, a lean air-fuel ratio exhaust gas containing a high concentration of oxygen is supplied to the HC adsorbent 5 and the exhaust gas purifying catalyst 7. Therefore, the exhaust gas purifying catalyst 7 absorbs and stores oxygen in the exhaust gas.

When a stable operation of the engine begins after the starting, the temperature of the exhaust gas increases, and the temperature of the HC adsorbent 5 reaches the releasing temperature in a short time after the start of the engine (for example, 10 to 20 seconds after the completion of the starting operation). Therefore, a short time after the start of the engine, HC is rapidly released from the HC adsorbent 5 and, thereby, the air-fuel ratio of the exhaust gas flows out from the HC adsorbent 5 becomes rich. As explained before, although cerium combines with oxygen even at a low temperature, it is required that the catalytic components reach a high temperature in order to cause cerium oxide to release oxygen. However, since the temperature of the exhaust gas purifying catalyst 7 also becomes high due to increase in the exhaust gas temperature when the HC adsorbent reaches the releasing temperature, the oxygen absorbed during the lean air-fuel ratio operation of the engine after the start is automatically released from the exhaust gas purifying catalyst 7 when the rich air-fuel ratio exhaust gas flows into the catalyst 7. Therefore, the HC released from the HC adsorbent 5 reacts with the oxygen released from the exhaust gas purifying catalyst 7 and all the HC in the exhaust gas is purified on the exhaust gas purifying catalyst 7. Thus, the HC discharged from the engine 1 during the starting operation is purified and is prevented from diffusing into the atmosphere.

The releasing of HC from the HC adsorbent ends in a relatively short time and, when the releasing of HC ends, the air-fuel ratio of the exhaust gas flowing into the catalyst 7 returns to a lean air-fuel ratio. When a time sufficient for the HC adsorbent to release the adsorbed HC has lapsed, the ECU 30 changes the target air-fuel ratio for the air-fuel ratio control, and feedback controls the engine air-fuel ratio based on the output of the air-fuel ratio sensor 15 at the stoichiometric air-fuel ratio. Therefore, once the releasing of the HC from the HC adsorbent 5 ends, the air-fuel ratio of the exhaust gas flowing into the catalyst becomes the stoichiometric air-fuel ratio, thereby HC and CO as well as $NO_x$ in the exhaust gas are purified by the catalyst 7 at a high efficiency.

As explained above, according to the present embodiment, since the exhaust gas purifying catalyst 7 absorbs and stores a sufficient amount of oxygen before the releasing of HC from the HC adsorbent 5 begins, oxygen is released from the catalyst 7 as soon as the releasing of the HC from the HC adsorbent begins and, thereby the released HC is purified by the catalyst 7. Further, since the exhaust gas purifying catalyst 7 automatically releases an exact amount of oxygen required for maintaining the air-fuel ratio of the exhaust gas flows out from the catalyst 7 at the stoichiometric air-fuel ratio, i.e., an exact amount of oxygen required for oxidizing HC in the exhaust gas is automatically released from the catalyst 7, the HC released from the HC adsorbent 5 is completely purified without requiring a complicated control system for secondary air.

Figure 2:
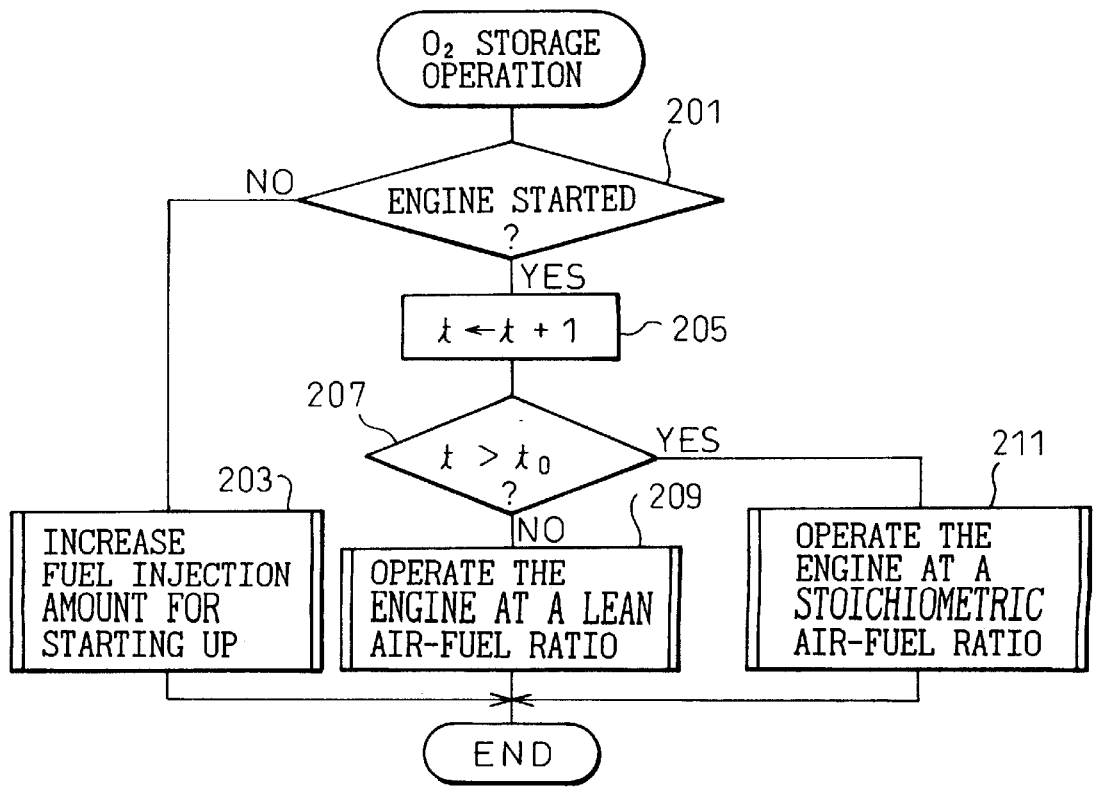
FIG. 2 is a flowchart explaining an example of an operation for storing oxygen in the exhaust gas purifying catalyst.

FIG. 2 shows a flowchart explaining the operation for storing oxygen in the exhaust gas purifying catalyst 7 (this operation is referred to as "an $O_2$ storage operation" hereinafter). This $O_2$ storage operation is carried out by a routine executed by the ECU 30 at predetermined intervals.

In FIG. 2, at step 201, it is determined whether the engine has started (i.e., whether the engine starting operation has completed). At step 201, it is determined that the engine has started if the engine speed is higher than a predetermined value (for example, about 400 rpm). If the engine is not started at step 201, i.e., if the engine speed is lower than the predetermined value, since this means the starting operation is being carried out, the routine proceeds to step 203 to control the fuel injection amount in accordance with the engine temperature (for example, a cooling water temperature of the engine) and the engine cranking speed in such a manner that the engine is operated at a considerably rich air-fuel ratio.

If it is determined that the engine has started at step 201, the routine performs step 205 to increase a time counter t by 1. The time counter t is a counter for measuring the time lapsed since the completion of the starting operation, and is reset to 0 when a main switch of the engine is turned ON at the beginning of the starting operation.

At step 207, the routine determines whether the value of the counter t has reached a predetermined value $t_0$ i.e., whether a time corresponding to the counter value $t_0$ has lapsed since the engine started. If the time $t_0$ has not lapsed since the engine started, the target air-fuel ratio of the engine air-fuel ratio feedback control is set at a lean air-fuel ratio (about 16) at step 209. If the time $t_0$ has lapsed at step 207, the routine performs step 211 to set the target air-fuel ratio of the engine air-fuel ratio feedback control at the stoichiometric air-fuel ratio. Therefore, the engine is operated at a lean air-fuel ratio until the time $t_0$ has lapsed after the engine started, and the exhaust gas purifying catalyst 7 absorbs oxygen in the lean air-fuel ratio exhaust gas. Further, after the time $t_0$ has lapsed, since the engine is operated at the stoichiometric air-fuel ratio, the exhaust gas purifying catalyst 7 purifies HC and CO as well as $NO_x$ at a high efficiency. The value $t_0$ of the counter corresponds to the time required for the HC adsorbent 5 to release all the absorbed HC and is set to a counter value corresponding to, for example, 20 to 40 seconds in this embodiment. However, the value $t_0$ varies in accordance with the size of the HC adsorbent and the type of the engine and is preferably determined based on experiment using an actual engine and HC adsorbent.

Figure 3:
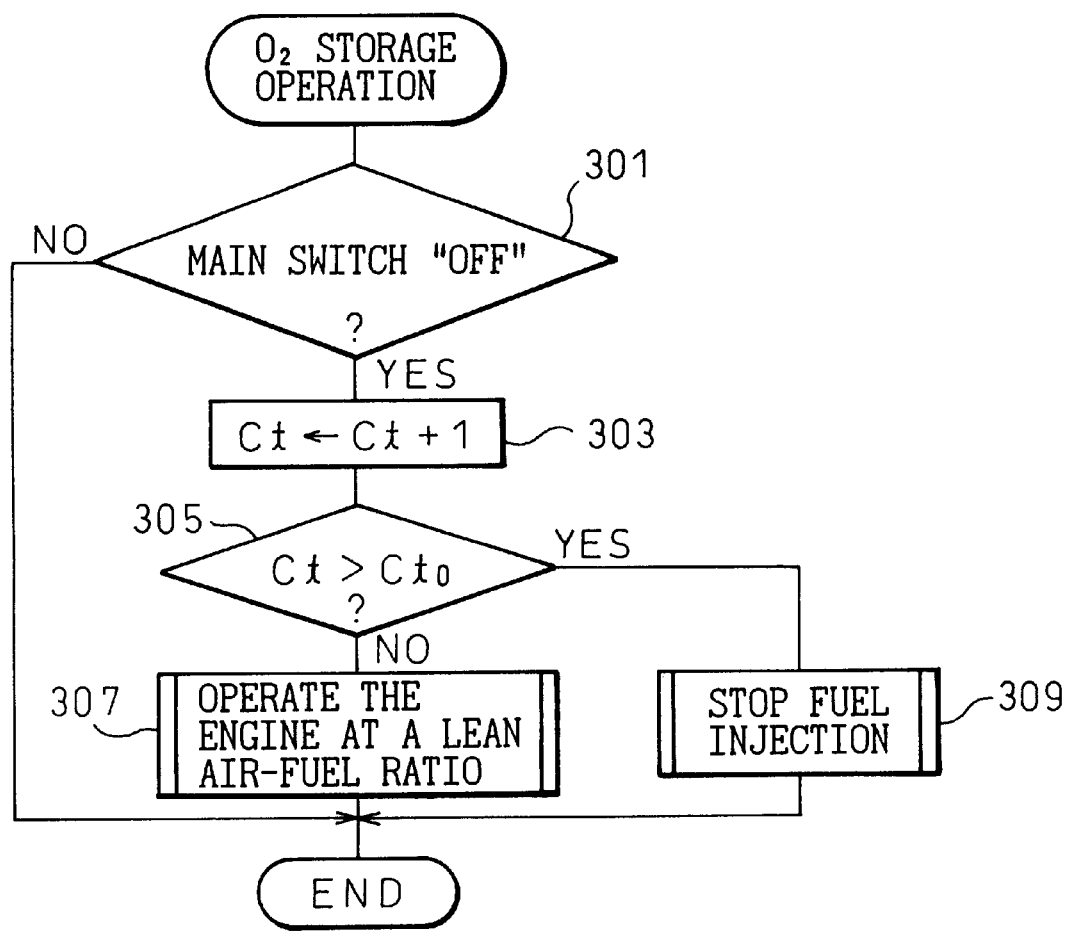
FIG. 3 is a flowchart explaining another example of an operation for storing oxygen in the exhaust gas purifying catalyst.
Figure 4:
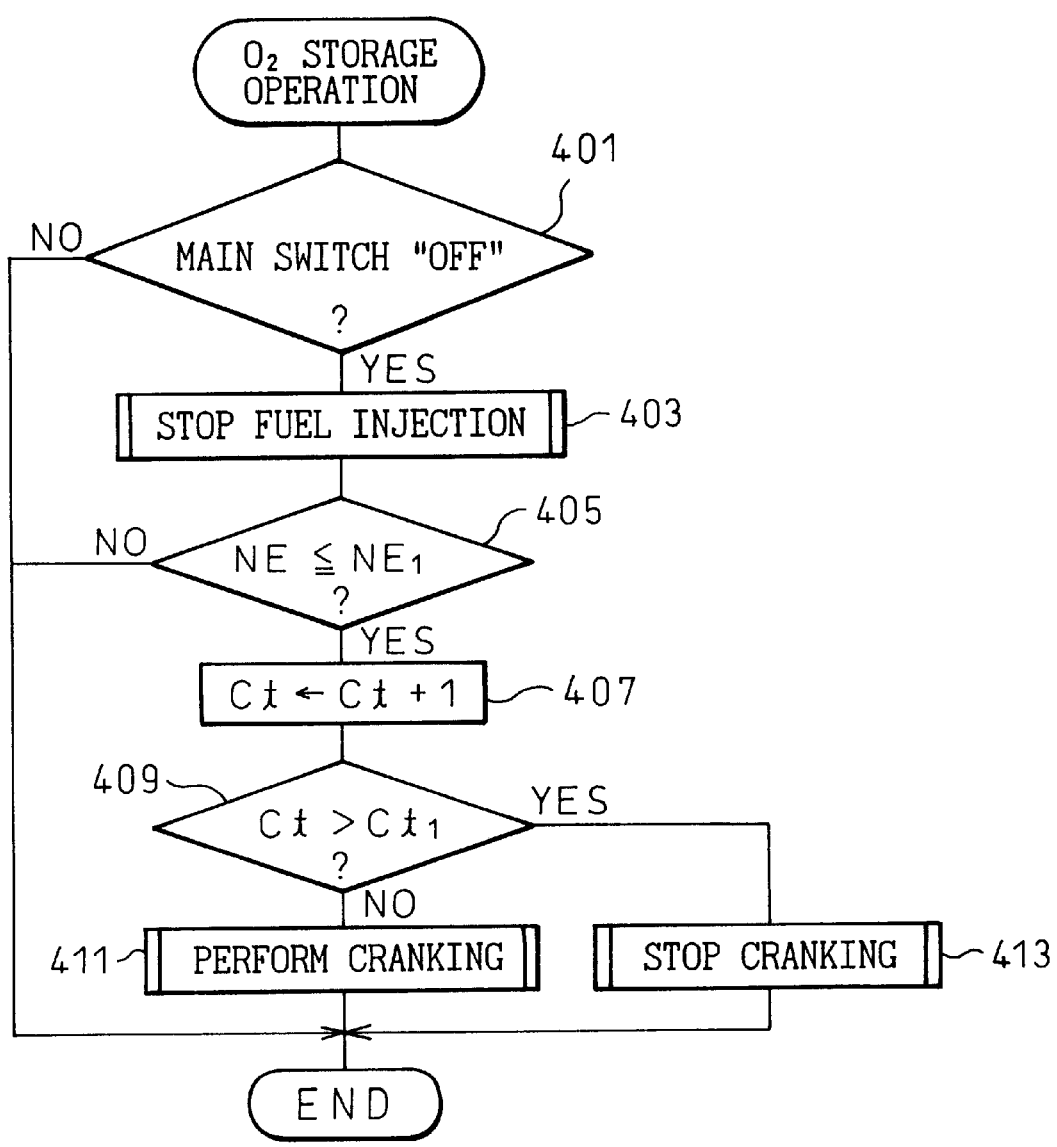
FIG. 4 is a flowchart explaining another example of an operation for storing oxygen in the exhaust gas purifying catalyst.

Although the $O_2$ storage operation is performed by operating the engine at a lean air-fuel ratio after the engine has started, the $O_2$ storage can be performed when the engine is stopped to prepare for the next start of the engine. FIGS. 3 and 4 show flowcharts explaining examples of $O_2$ storage operation of the embodiment in FIG. 1 which is carried out when the engine is stopped.

FIG. 3 shows a flowchart of an $O_2$ storage operation in which the engine is operated at a lean air-fuel ratio to cause the exhaust gas purifying catalyst 7 to absorb oxygen when the engine stop operation is carried out. This operation is carried out as a routine performed by the ECU 30 at predetermined intervals.

In FIG. 3, at step 301, the routine determines whether the stop operation of engine is carried out, i.e., whether the main switch of the engine is at an OFF position and, if it is not at the OFF position, the routine terminates without performing step 303 and other steps. If the main switch is at the OFF position at step 301, the routine increases a time counter Ct by 1 at step 303, and determines at step 305 whether the value of the counter Ct after it is increased becomes larger than a predetermined value $Ct_0$. Ct is a counter for measuring the time lapsed since the main switch has been turned off. The value of the counter Ct is reset to 0 when the engine starts. If $Ct \leq Ct_0$ at step 305, i.e., if the time corresponding to the counter value $Ct_0$ has not is lapsed since the main switch has been turned off, the routine performs step 307 to set the target air-fuel ratio of the engine air-fuel ratio feedback control at a predetermined lean air-fuel ratio (for example, about 16). On the other hand, if $Ct > Ct_0$ at step 305, i.e., if the time corresponding to the counter value $Ct_0$ has lapsed, the routine performs step 309 to stop the engine by terminating the fuel injection. Thus, by performing steps 303 to 309, the engine is operated at a lean air-fuel ratio for a time period corresponding to the counter value $Ct_0$ after the engine stop operation is started (i.e., after the engine main switch is turned off). Therefore, the exhaust gas purifying catalyst 7 absorbs and stores oxygen during the stop operation of the engine. The oxygen stored in the exhaust gas purifying catalyst 7 is used at the next engine start. The counter value $Ct_0$, i.e., the time period in which the engine is operated at a lean air-fuel ratio is set at a value large enough in order to assure the exhaust gas purifying catalyst 7 to absorb oxygen to its maximum absorbing capacity during this period. A suitable value for $Ct_0$ varies in accordance with the size of the exhaust gas purifying catalyst 7 and the type of the engine, therefore, it is preferable to determine the value of $Ct_0$ based on experiment using the actual engine 1 and the exhaust gas purifying catalyst.

FIG. 4 is another example of the $O_2$ storage operation of the embodiment in FIG. 1 which is carried out during the engine stop operation. In this operation, a lean air-fuel ratio exhaust gas is supplied to the exhaust gas purifying catalyst 7 by cranking the engine 1 after terminating the fuel injection to the engine during the engine stop operation. This $O_2$ storage operation is carried out as a routine performed by the ECU 30 at predetermined intervals.

In FIG. 4, at step 401, the routine determines whether the main switch of the engine 1 is at the OFF position and, if it is not at the OFF position, the routine terminates immediately. If the main switch is at the OFF position at step 401, the routine terminates the fuel injection to the engine at step 403 and, then, determines whether the engine speed NE falls to a predetermined value $NE_1$. $NE_1$ is a cranking speed of the engine when the engine is fully warmed up. If the engine speed NE is higher than the cranking speed $NE_1$ at step 405, i.e., if the engine speed NE is higher than the speed of the starter motor, the routine terminates immediately since the starter motor cannot engage the engine when the engine speed is higher than the starter motor speed. If $NE \leq NE_1$ at step 405, the routine increases the value of a time counter $Ct_1$ by 1 at step 407 and activates the starter motor at step 411 to perform the cranking of the engine 1. The cranking of the engine is continued until the value of the counter Ct reaches a predetermined value $Ct_1$ at step 409. When the value of the counter Ct reaches $Ct_1$, the routine deactivates the starter motor to terminate the cranking operation. The function of the time counter Ct is similar to that of the counter Ct in FIG. 3.

As explained above, by the routine shown in FIG. 4, the fuel injection to the engine is immediately terminated when the engine stop operation is started, and the cranking of the engine is performed after the termination of the fuel injection. Therefore, when the engine stop operation is performed, a lean air-fuel ratio exhaust gas consisting of almost pure air is supplied to the exhaust gas purifying catalyst 7 for a predetermined period and, thereby, the exhaust gas purifying catalyst 7 absorbs and stores oxygen in the exhaust gas.

The length of the period to perform the cranking of the engine, i.e., the counter value $Ct_1$ is determined based on the size of the exhaust gas purifying catalyst 7 and the amount of the fuel remained in the intake ports and the cylinders of the engine so that the exhaust gas purifying catalyst 7 absorbs oxygen to its maximum absorbing capacity during this period. Similarly to $Ct_0$ in FIG. 3, the value of $Ct_1$ is preferably determined based on experiment.

Although the time counter Ct is used in FIG. 4 to measure the time period for the cranking operation, it is possible to count the accumulated number of rotations of the engine during the cranking operation without using the counter Ct. In this case, the cranking of the engine is terminated when the accumulated number of rotations of the engine during the cranking reaches a predetermined value, i.e., when a predetermined amount of air is supplied to the exhaust gas purifying catalyst 7.

Figure 5:
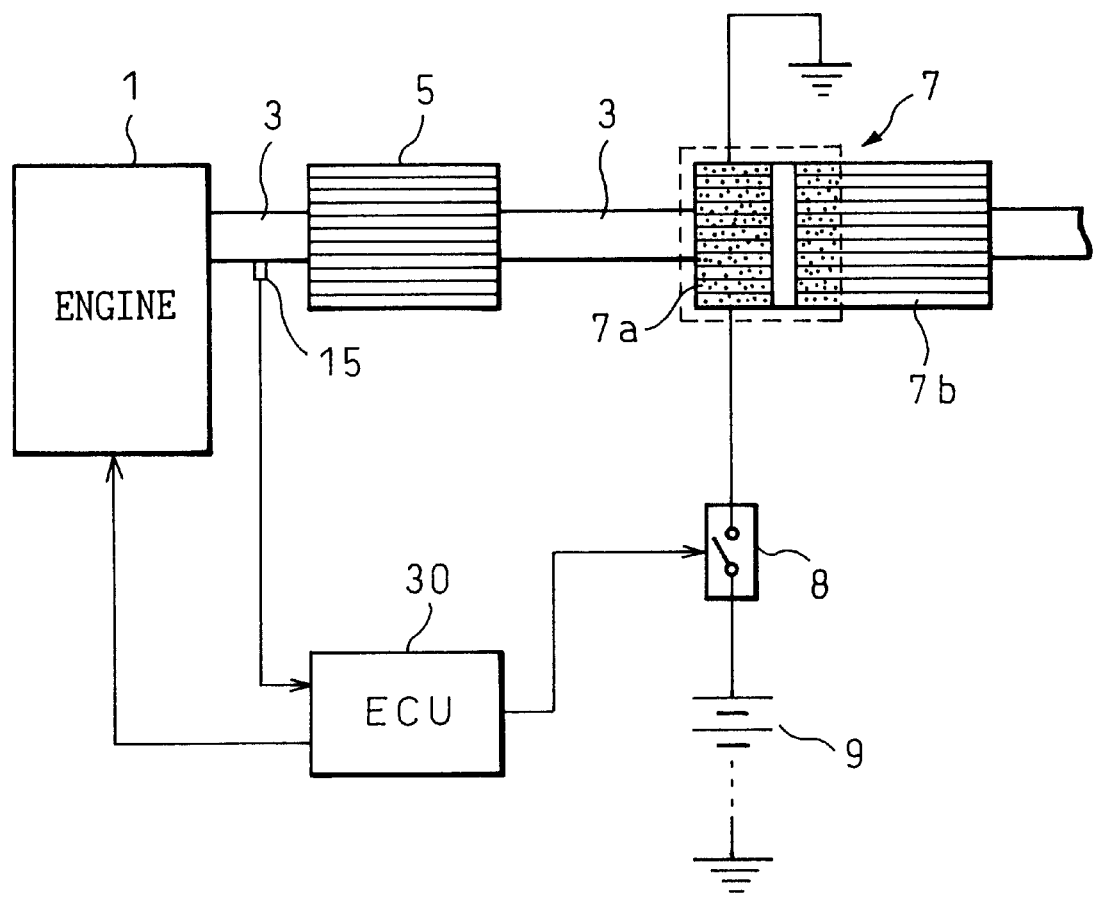
FIG. 5 schematically illustrates the general configuration of another embodiment of the exhaust gas purification device according to the present invention.

Next, another embodiment of the present invention is explained with reference to FIG. 5. FIG. 5 shows a general configuration of another embodiment of the device for purifying exhaust gas according to the present invention. In FIG. 5, reference numerals the same as those in FIG. 1 represent similar elements.

In this embodiment, the exhaust gas purifying catalyst 7 is composed of an electrically heated catalytic converter (EHC) 7a of small capacity and a main catalytic converter 7b which is disposed immediately downstream of the EHC 7a and has a larger capacity.

The EHC 7a in this embodiment uses a honeycomb type metal substrate and an alumina layer, which acts as carrier of catalytic component, is formed on the substrate. Catalytic components such as platinum (Pt), palladium (Pd) and rhodium (Rh) are carried on this alumina layer. In this embodiment, the substrate of the EHC 7a acts as an electric heater when electric current is supplied to the substrate and raises the temperature of the catalytic component to the activating temperature in a short time. As can be seen from FIG. 5, a relay 8 is disposed in the electric supply line from a battery 9, and the input/output interface of the ECU 30 is connected to a relay 8 via a driving circuit not shown in the drawing. The ECU 30 activates the relay 8 for a predetermined period from the engine start to supply electricity to the EHC 7a. By doing so, the temperature of the EHC 7a reaches the activating temperature and starts the catalytic action in a short time (for example, 10 to 20 seconds) after the engine starting operation is commenced. When the catalytic action of the EHC 7a starts, since heat is generated by the catalytic reaction, the temperature of the exhaust gas passing through the EHC 7a becomes high and the upstream side of the main catalyst 7b is heated by the high temperature exhaust gas and reaches the activating temperature.

In this embodiment, the amount (concentration) of cerium (Ce) carried by the EHC 7a and the upstream side of the main catalyst 7b is higher than other portion of the main catalyst 7b. As explained before, it is required that the temperature of the catalytic component such as platinum (Pt) must be high (for example, more than about 200° C.) in order to cause cerium oxide to release oxygen. Since the temperature of the EHC 7a and the upstream side of the main catalyst 7b rises rapidly when electricity is supplied to the EHC 7a, by carrying a high concentration of cerium on these portions, a large amount of oxygen can be released from these portions when the releasing of HC from the HC adsorbent 5 occurs.

The total volume of the portions of the substrate on which a high concentration of cerium is carried (the volume of the portion surrounded by the broken line in FIG. 5) is preferably selected in such a manner that a space velocity of the exhaust gas when the releasing of HC from the HC adsorbent 5 occurs (for example, in a fast idle condition) becomes less than about 100,000/Hr at this portion.

In this embodiment, the ECU 30 energizes the EHC 7a for a predetermined time after the engine started in order to facilitate releasing of oxygen from the EHC 7a and the main catalyst 7b. However, the $O_2$ storage operation as explained in one of FIGS. 2 to 4 is also performed in this embodiment.

Next, another embodiment of the present invention will be explained with reference to FIG. 6.

In the previous embodiment, an $O_2$ storage operation is carried out by operating the engine 1 at a lean air-fuel ratio during the start or stop operation of the engine or by cranking the engine during the stop operation. However, the device in embodiment in FIG. 6 is provided with a secondary air supply unit for supplying secondary air during the period after the engine has started and before the releasing of HC from the HC adsorbent 5 occurs.

Figure 6:
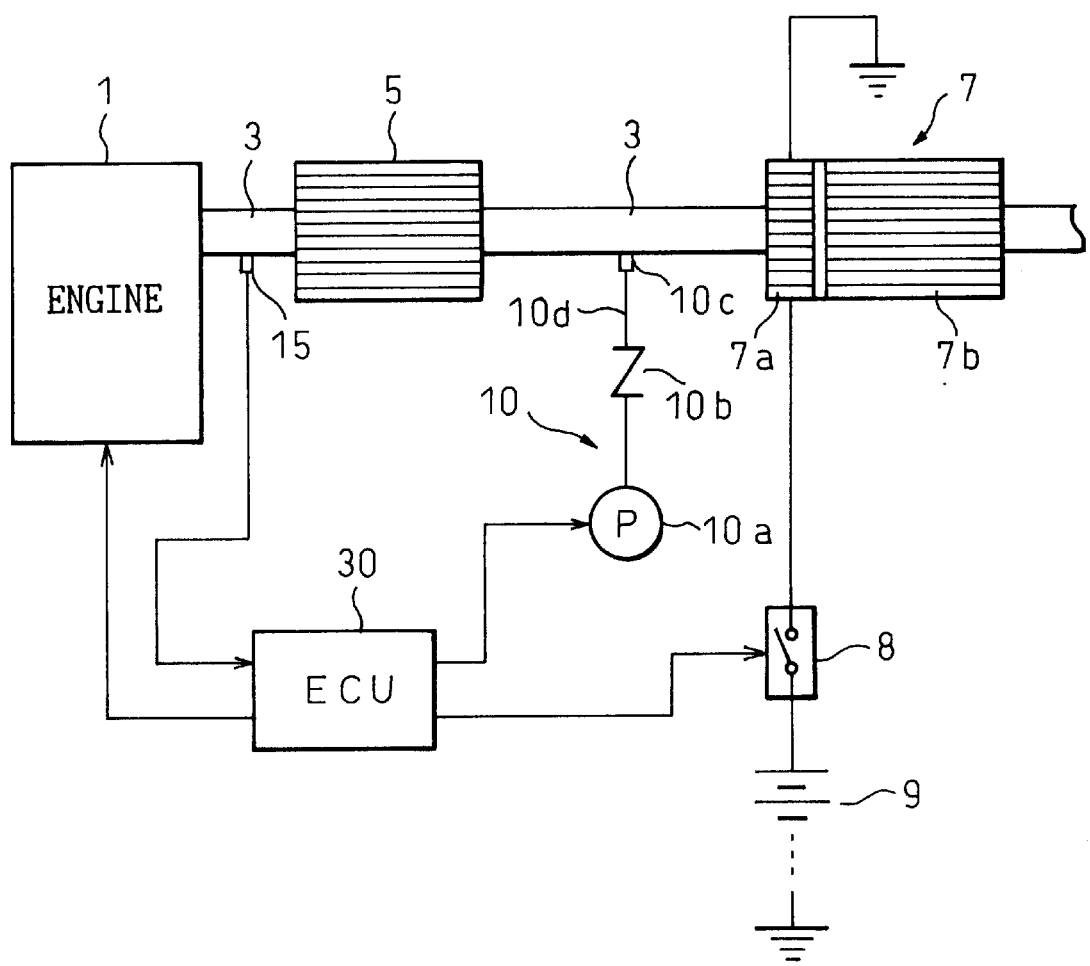
FIG. 6 schematically illustrates the general configuration of another embodiment of the exhaust gas purification device according to the present invention.

In FIG. 6, reference numerals the same as those in FIGS. 1 and 5 represent similar elements. As can be seen from FIG. 6, the exhaust gas purifying catalyst 7 in this embodiment is also composed of an EHC 7a and a main catalyst 7b. However, a secondary air supply unit 10 for supplying the exhaust gas passage 3 between the HC adsorbent 5 and the EHC 7a is provided in this embodiment. The secondary air supply unit 10 includes an electric air pump 10a, a nozzle 10c for injecting air into the exhaust gas passage 3 and a check valve 10b disposed in the air passage 10d connecting the air pump 10a to the nozzle 10c.

In this embodiment, the $O_2$ storage operation is carried out by supplying secondary air to the exhaust gas purifying catalyst 7 for a predetermined period after the engine starts or after the engine stops. Further, similarly to the embodiment shown in FIG. 5, the EHC 7 is also activated for a predetermined period after the engine starts in this embodiment.

Figure 7:
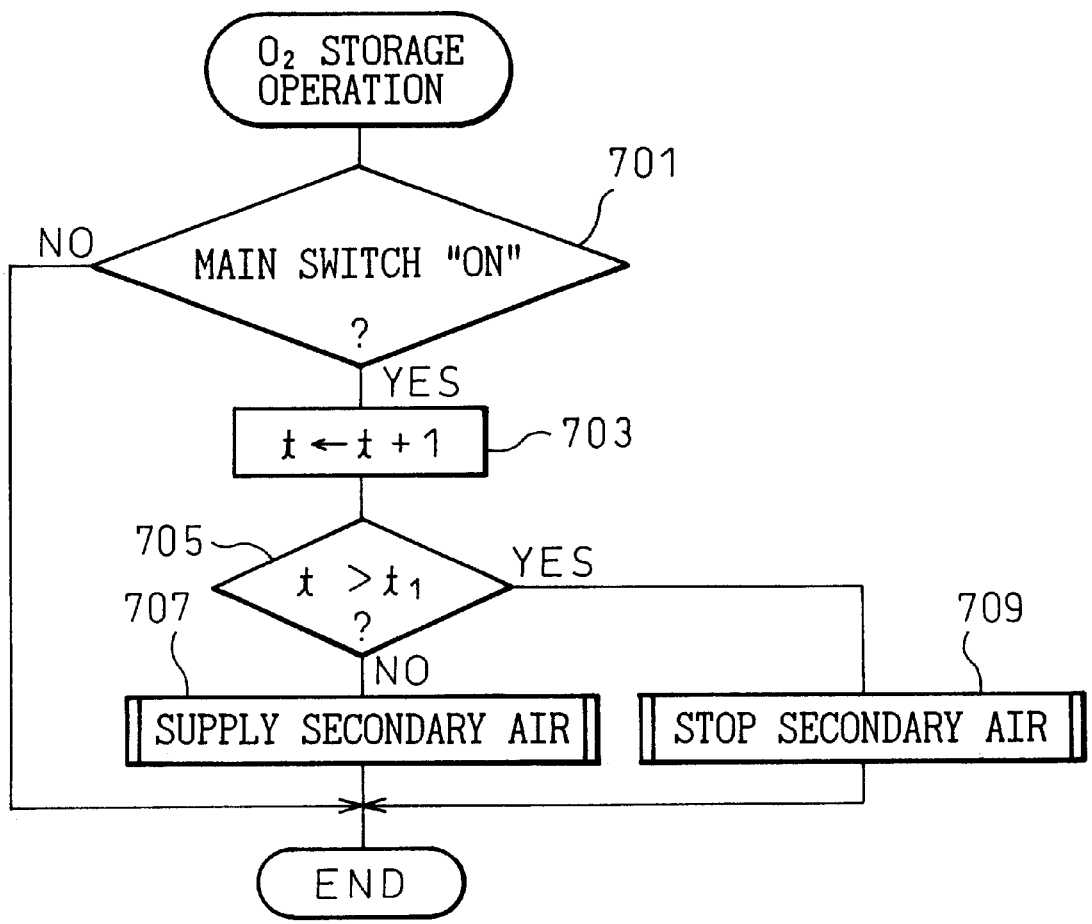
FIG. 7 is a flowchart explaining an example of an operation for storing oxygen in the exhaust gas purifying catalyst in the embodiment in FIG. 6.
Figure 8:
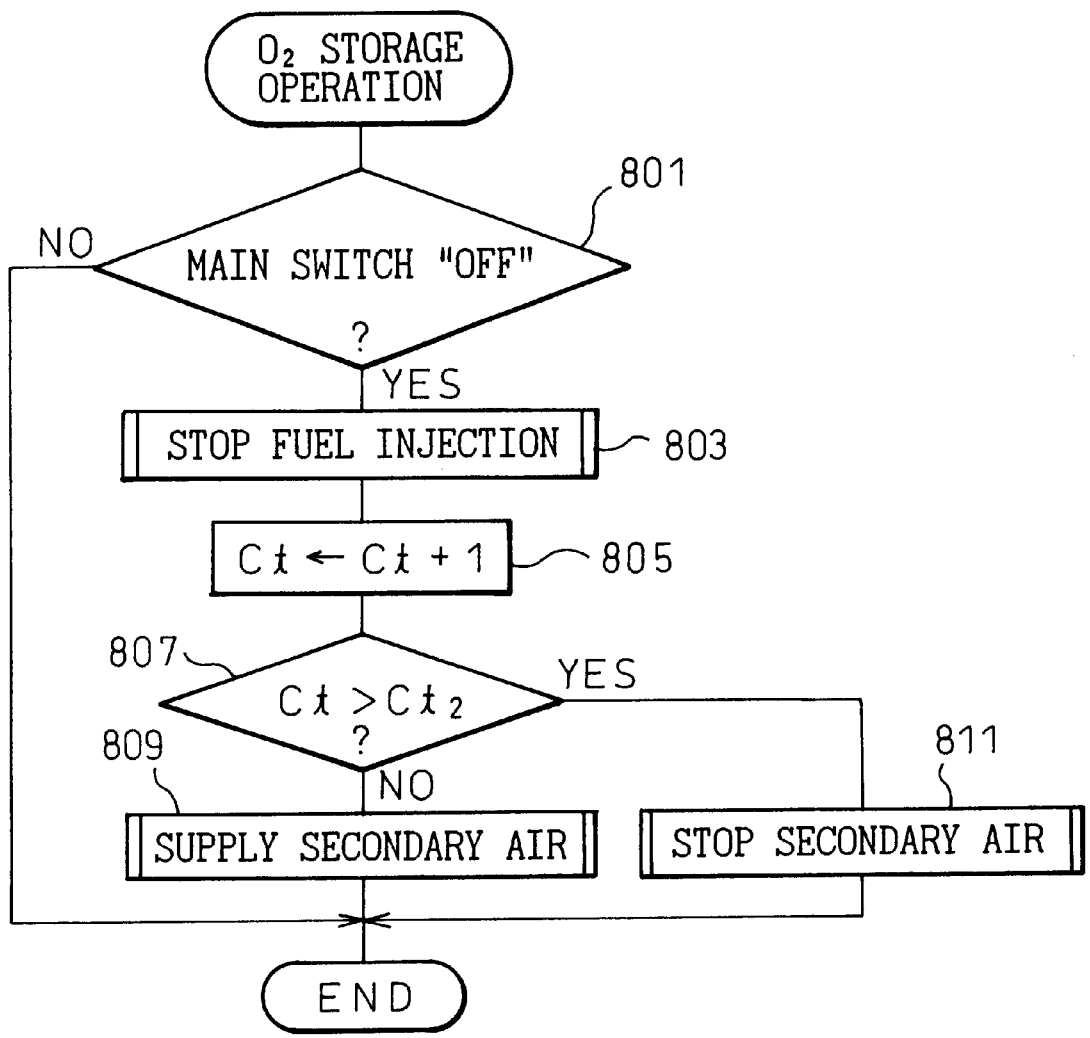
FIG. 8 is a flowchart explaining another example of an operation for storing oxygen in the exhaust gas purifying catalyst in the embodiment in FIG. 6.

FIGS. 7 and 8 show flowcharts explaining examples of the $O_2$ storage operation of the embodiment in FIG. 6. FIG. 7 shows an example of the $O_2$ storage operation which supplies secondary air to the exhaust gas purifying catalyst 7 during the engine starting operation and FIG. 8 show an example of the $O_2$ storage operation which supplies secondary air to the exhaust gas purifying catalyst 7 after the engine stops.

In the flowchart in FIG. 7, the electric air pump 10a is activated in order to supply secondary air to the exhaust gas purifying catalyst 7 when the main switch of the engine is turned on (step 701), and the operation of the air pump 10a is continued until the value of the time counter t reaches a predetermined value $t_1$ (steps 703, 705, 707). The air pump is stopped when the value of the counter t reaches the predetermined value $t_1$ (step 709). By supplying secondary air at the start of the engine, the air-fuel ratio of the exhaust gas flowing into the exhaust gas purifying catalyst 7 can be adjusted to a lean air-fuel ratio, thereby enabling the exhaust gas purifying catalyst 7 (the EHC 7a and the main catalyst 7b) to absorb a sufficient amount of oxygen without operating the engine 1 at a lean air-fuel ratio. The counter value $t_1$ corresponds to a time required for exhaust gas purifying catalyst 7 to absorb oxygen to its maximum absorbing capacity and is preferably determined by experiment.

In the flowchart in FIG. 8, the fuel injection to the engine is terminated immediately after the main switch of the engine is turned off (steps 801 and 803). The air pump 10a is activated in order to supply secondary air to the exhaust gas purifying catalyst 7 when the main switch is turned off and is kept running until the value of the counter Ct reaches a predetermined value $Ct_2$ (steps 805 to 811). By supplying secondary air to the exhaust gas purifying catalyst 7 after the engine has stopped, a lean air-fuel ratio exhaust gas (in this case, secondary air) is supplied to the exhaust gas purifying catalyst 7, thereby the catalyst 7 absorbs and stores sufficient amount of oxygen in order to prepare for the next start of the engine.

Figure 9:
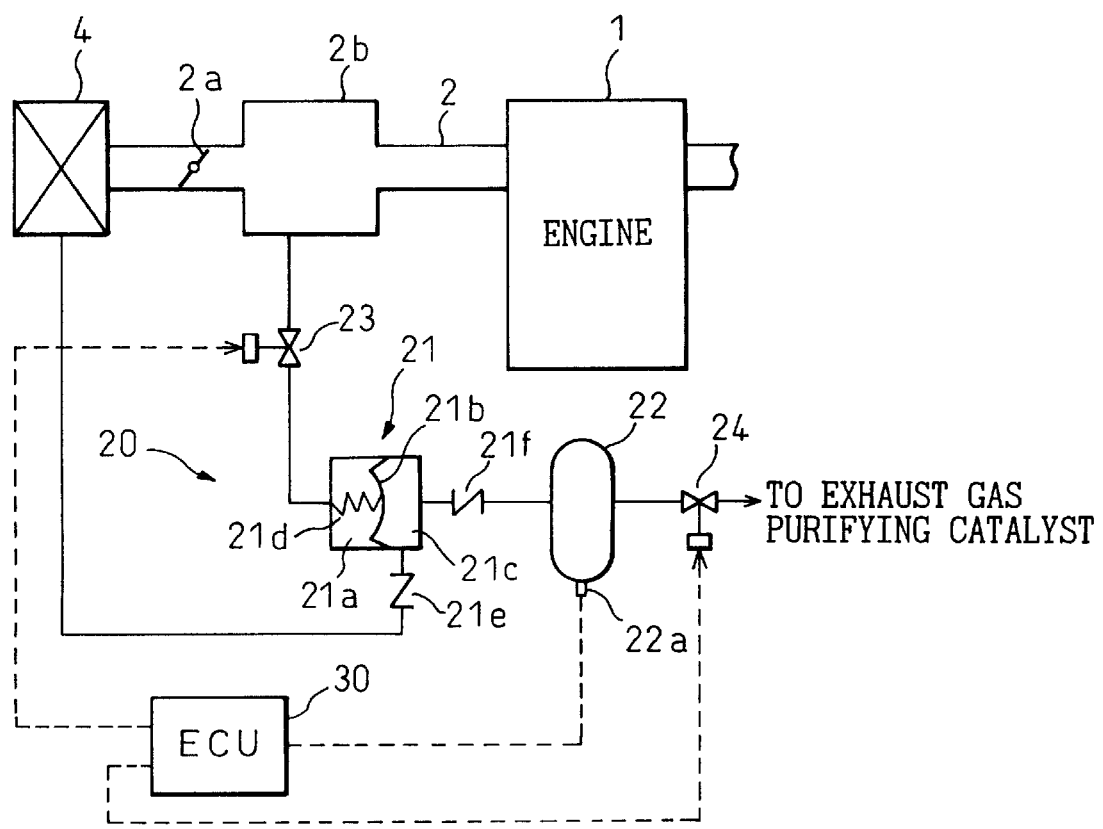
FIG. 9 schematically illustrates the general configuration of another embodiment of the exhaust gas purification device according to the present invention.

FIG. 9 shows another example of the configuration of a secondary air supply unit which does not use the electric air pump 10a. Since the secondary air supply unit 10 in FIG. 6 uses the electric air pump 10a as the air source, electric power is required for driving the air pump. As stated before, the EHC 7a is activated at the engine start in the embodiment in FIG. 7. Since the electric power consumption of the EHC 7a is large, if the power consumption by the electric air pump 10a is added at the start of the engine, the load on the battery may increase. Further, the load on the battery may also increase when the electric air pump 10a is operated after the engine has been stopped.

To solve this problem, the secondary air supply unit in FIG. 9 utilizes a diaphragm type air pump which is driven by pulsation of the pressure in the inlet air passage during the engine operation. Namely, in this embodiment, air is pressurized by the diaphragm pump and stored in an accumulator, and the pressurized air in the accumulator is used for secondary air.

In FIG. 9, reference numeral 2 designates an inlet air passage of the engine 1, 4 designates an air cleaner. 2a is a throttle valve disposed in the inlet air passage 2, 2b is a surge tank disposed in the inlet air passage 2 downstream of the throttle valve 2a. In FIG. 9, the secondary air supply unit 20 in this embodiment includes a diaphragm type air pump 21 and an accumulator 22. In the diaphragm pump 21, a negative pressure chamber 21a, and a pressure chamber 21c are formed. The chambers 21a and 21c are separated by a diaphragm 21b. The negative pressure chamber 21a is connected to the surge tank 2b via a shut off valve 23. Further, a spring 21d which urges the diaphragm 21b towards the pressure chamber 21c side is disposed in the negative pressure chamber 21a. The pressure chamber 21c is connected to the air cleaner 4 via a check valve 21e that allows air to flow only from the air cleaner 4 to the pressure chamber 21c. Further, the pressure chamber 21c is connected to the accumulator 22 via a check valve 21f that allows air to flow only from the pressure chamber 21c to the accumulator. Although not shown in the drawing, the accumulator 22 is connected to the exhaust gas passage between the HC adsorbent 5 and the exhaust gas purifying catalyst 7 via a shut off valve 24 operated by a control signal from the ECU 30.

The ECU 30 connects the negative pressure chamber 21a of the diaphragm pump 21 to the surge tank 2b by opening the shut off valve 23 during the engine operation, thereby introducing the negative pressure in the surge tank 2b into the negative pressure chamber 21a. When the negative pressure in the surge tank increases (i.e., when the absolute pressure in the surge tank becomes low), the diaphragm 21b deflects towards the negative pressure chamber 21a against the urging force of the spring 21d. This causes an increase in the volume of the pressure chamber 21c and, thereby, clean air flows into the pressure chamber 21c through the air cleaner 4 and the check valve 21e. When the negative pressure in the surge tank 2b decreases (i.e., when the absolute pressure in the surge tank 4 becomes high) in this condition, the diaphragm 21b deflects towards the pressure chamber side due to the urging force of the spring 21d and expels the air in the pressure chamber 21c into the accumulator 22 through the check valve 21f. Since the shut off valve is kept closed in this condition, air is pressurized and stored in the accumulator 22.

The ECU 30 monitors the pressure in the accumulator 22 by a pressure sensor 22a disposed on the accumulator 22 and, when the pressure of the air in the accumulator exceeds a predetermined value, closes the shut off valve 23. When the shut off valve 23 is closed, since the negative pressure chamber 21a is isolated from the negative pressure in the surge tank 2b, the operation of the diaphragm pump 21 is stopped. Thus, air of the predetermined pressure is stored in the accumulator 22 during the engine operation.

In this embodiment, the ECU 30 opens the shut off valve 24 for a predetermined period after the engine starting operation is commenced, or after the engine has been stopped in order to supply secondary air to the exhaust gas purifying catalyst 7. According to this embodiment, secondary air is supplied to the exhaust gas purifying catalyst 7 without causing a load on the battery.

The volume of the accumulator 22 and the pressure of the air, i.e., the amount of secondary air to be supplied to the exhaust gas purifying catalyst 7 is determined in accordance with size and type of the catalyst 7 based on experiment. The $O_2$ storage operation in this embodiment is the same as those in FIGS. 7 and 8.

Figure 10:
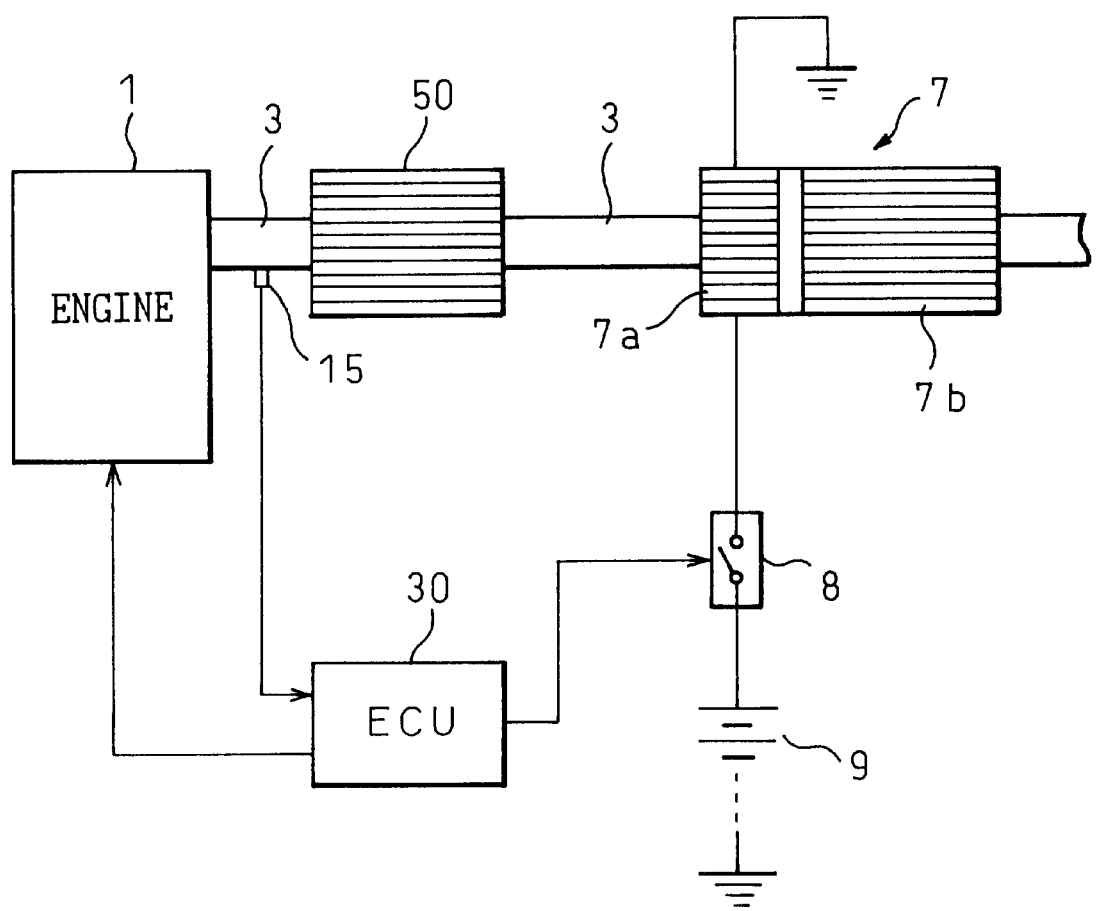
FIG. 10 schematically illustrates the general configuration of another embodiment of the exhaust gas purification device according to the present invention.

Next, another embodiment of the present invention is explained with reference to FIG. 10. FIG. 10 shows a general configuration of the exhaust gas purifying device which is similar to that in FIG. 5. In FIG. 10, reference numerals the same as those in FIG. 5 represent similar elements. This embodiment is different from the embodiment in FIG. 5 in that a second exhaust gas purifying catalyst 50 which performs the adsorbing and releasing operation of HC, as well as $O_2$ storage, is disposed in the exhaust gas passage in place of the HC adsorbent 5 in FIG. 5.

The second exhaust gas purifying catalyst 50 comprises, for example, a monolithic substrate made of cordierite. The walls of cells in the substrate are coated with an inorganic porous material such as alumina ($Al_2O_3$) and silica ($SiO_2$). In this coating layer, an $O_2$ storage component such as cerium (Ce) and catalytic components such as platinum (Pt), palladium (Pd) or rhodium (Rh) are impregnated. The second exhaust gas purifying catalyst 50 performs adsorbing and releasing operations of HC as well as oxygen. Namely, the second exhaust gas purifying catalyst 50 adsorbs HC in the exhaust gas when the temperature is lower than the releasing temperature and releases the adsorbed HC when the temperature becomes higher than the releasing temperature. Further, the second exhaust gas purifying catalyst absorbs oxygen in the exhaust gas when the air-fuel ratio of the exhaust gas is lean and releases the absorbed oxygen when the air-fuel ratio of the exhaust gas is rich. In addition to the functions stated above, the second exhaust gas purifying catalyst 50 has the function of purifying HC, CO and $NO_x$ in the exhaust gas.

In this embodiment, oxygen is absorbed and stored in both of the exhaust gas purifying catalyst 7 (the EHC 7a and the main catalyst 7b) and the second exhaust gas purifying catalyst 50 by operating the engine at a lean air-fuel ratio after the engine has started. The high concentration of HC discharged from the engine during the starting operation is adsorbed by the second exhaust gas purifying catalyst 50. Further, when the adsorbed HC is released from the second exhaust gas purifying catalyst 50 by the exhaust gas temperature rise, the released HC is purified by the exhaust gas purifying catalyst 7 and the second exhaust gas purifying catalyst 50 using oxygen released from the catalysts 7 and 50.

Figure 11:
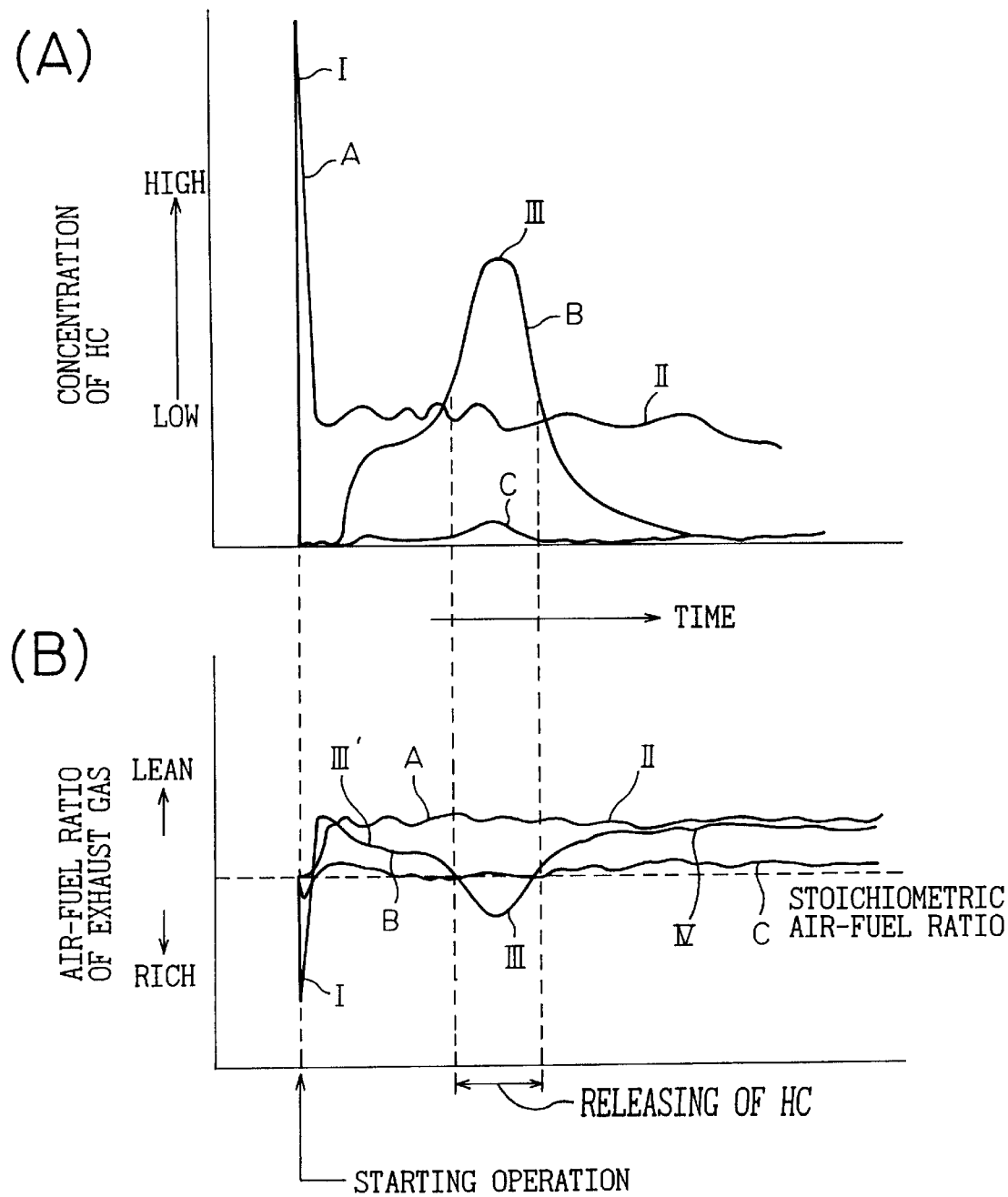
FIG. 11 shows timing charts explaining the exhaust gas purifying operation of the present invention.

FIG. 11 shows timing charts which explain the purifying operation of the HC after the engine has started. The chart (A) in FIG. 11 shows the change in the concentration of HC in the exhaust gas at various parts in the exhaust gas system after the engine has started. The chart (B) in FIG. 11 shows the change in the air-fuel ratio of the exhaust gas at the parts in the exhaust gas the same as those in the chart (A). In the charts (A) and (B), the curves A indicate the changes in the HC concentration and the air-fuel ratio of the exhaust gas at the outlet of the engine. The curves B in the charts (A) and (B) indicate the changes in the HC concentration and the air-fuel ratio of the exhaust gas at the outlet of the second exhaust gas purifying catalyst 50. The curves C in the charts (A) and (B) indicate the changes in the HC concentration and the air-fuel ratio of the exhaust gas at the outlet of the exhaust gas purifying catalyst 7.

As seen from the curves A in the charts (A) and (B) (at the outlet of the engine), the air-fuel ratio of the exhaust gas at the outlet of the engine temporarily becomes considerably rich during the starting operation of the engine since the fuel injection amount is increased to facilitate the starting of the engine (the period I in the chart (B), and a high concentration of HC is discharged (the period I in the chart (A)). Further, though the air-fuel ratio of the engine is controlled to a lean air-fuel ratio immediately after the engine has started (the period II in the chart (B)), HC at a relatively high concentration is discharged from the engine after the engine has started (the period II in the chart (A)) due to unstable combustion in the cylinders.

On the other hand, as seen from the curves B in the charts (A) and (B) (i.e., at the outlet of the second exhaust gas purifying catalyst 50), the high concentration of HC discharged from the engine during the starting operation is adsorbed by the second catalyst 50 and the concentration in the exhaust gas at the outlet of the second catalyst 50 does not increase during the starting operation of the engine. Further, since the engine is operated at a lean air-fuel ratio after the engine has started, a lean air-fuel ratio exhaust gas is supplied to the second catalyst 50. Therefore, the HC in the exhaust gas is purified by the second catalyst 50 and, also, surplus oxygen is absorbed and stored in the second catalyst 50.

The temperature of the exhaust gas gradually increases after the engine has started and, accordingly, the amount of HC released from the second catalyst 50 gradually increases. Therefore, the concentration of HC at the outlet of the second catalyst (the curve B in the chart (A)) gradually increases. Further, when the temperature of the exhaust gas reaches the releasing temperature, since a large amount of HC is released from the second catalyst 50 in a short time, the concentration of HC in the exhaust gas at the outlet of the second catalyst 50 temporarily increases by a large amount (the period III in the curve B in the chart (A)). In this period, since a part of the oxygen in the exhaust gas is consumed on the second catalyst 50 in order to purify HC and the rest of oxygen is adsorbed by the second catalyst 50, the air-fuel ratio of the exhaust gas at the outlet of the second catalyst 50 gradually changes from a lean air-fuel ratio to the stoichiometric air-fuel ratio (the period III' in the curve B in the chart (B)), and temporarily becomes a rich air-fuel ratio (the period III in the curve B in the chart (B)) when the releasing of the high concentration HC occurs. However, since oxygen is released from the second catalyst 50 when the air-fuel ratio of the exhaust gas becomes rich, a part of HC released from the second catalyst 50 is immediately purified within the second catalyst 50 and, thereby, the concentration of HC in the exhaust gas at the outlet of the second catalyst 50 becomes relatively low (the period III in the curve B in the chart (B)). After the releasing of HC from the second catalyst 50 has completed, the air-fuel ratio of the exhaust gas at the outlet of the second catalyst 50 returns to a lean air-fuel ratio (the period IV in the curve B in the chart (B)).

As seen from the curves C in the charts (A) and (B), since oxygen is adsorbed and stored in the exhaust gas purifying catalyst 7 (hereinafter referred to as "the downstream catalyst 7") during the lean air-fuel ratio operation of the engine, oxygen is released from the downstream catalyst 7 when the rich air-fuel ratio exhaust gas containing a high concentration of HC from the second catalyst 50 (the period III in the curve B in the charts (A) and (B)) reaches the downstream catalyst 7. Therefore, the HC released from the second catalyst 50 is purified by the downstream catalyst 7 and the concentration of HC in the exhaust gas at the outlet of the downstream catalyst 7 increases only slightly even when the releasing of HC from the second catalyst 50 occurs.

As explained above, since the second exhaust gas purifying catalyst 50 which is provided with the $O_2$ storage capability and the capability for adsorbing HC is disposed in the exhaust gas passage upstream of the exhaust gas purifying catalyst 7 in this embodiment, a part of the HC released from the second catalyst 50 is immediately purified within the second catalyst 50 by the oxygen released from the second catalyst 50. This causes the amount of HC to be purified by the downstream catalyst 7 to decrease and, thereby, the total efficiency of HC purification is increased.

Figure 12:
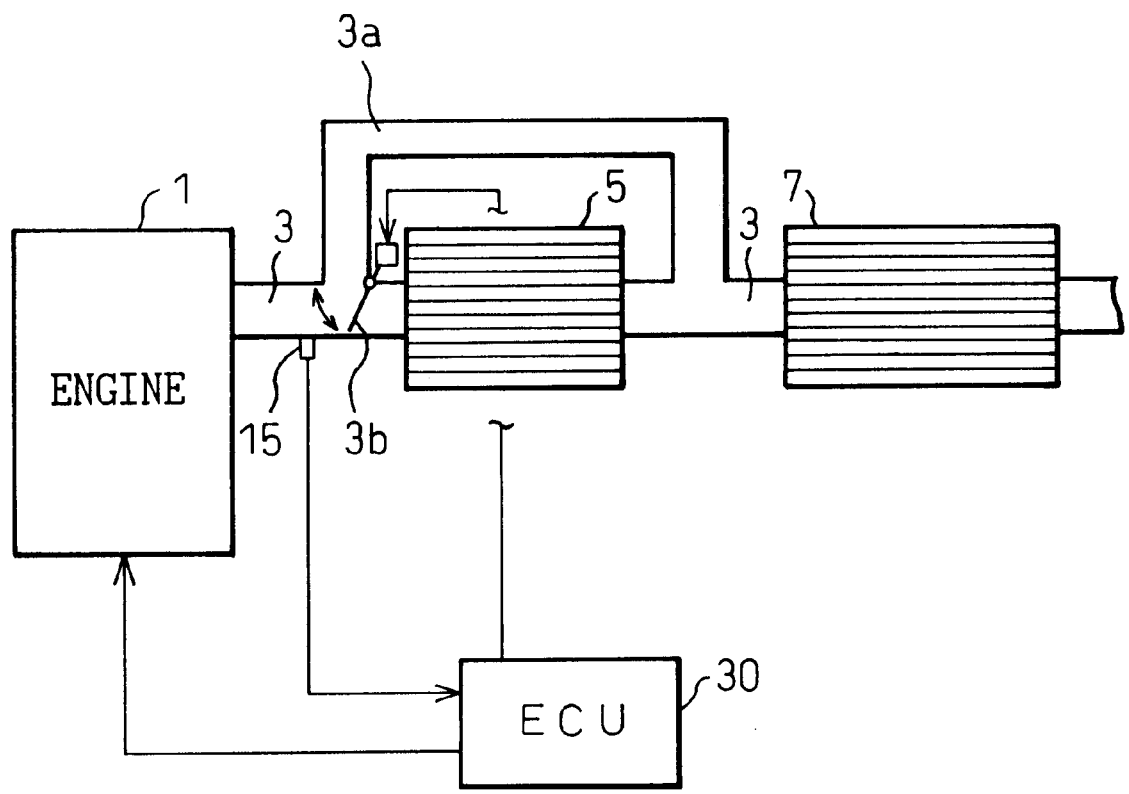
FIG. 12 schematically illustrates the general configuration of another embodiment of the exhaust gas purifying device according to the present invention.

Although the HC adsorbent and the exhaust gas purifying catalyst are disposed in the exhaust gas passage in this order from the upstream side and the exhaust gas from the engine always flows through the HC adsorbent during the engine operation in the embodiments explained above, the present invention is not limited to this configuration. For example, a bypass exhaust gas passage 3a and a bypass valve 3b, which switches the exhaust gas flow to the bypass passage 3a and the HC adsorbent 5 selectively, may be provided as shown in FIG. 12. In this case, the exhaust gas from the engine is supplied to the HC adsorbent 5 after the engine has started until the releasing of the HC from the HC adsorbent 5 is completed. After the releasing of HC from the HC adsorbent 5 is completed, the bypass valve 3b is switched to the position in which all the exhaust gas from the engine is directed to the bypass exhaust gas passage 3a. By switching the exhaust gas to the bypass exhaust gas passage 3a during the normal operation of the engine, the deterioration of the HC adsorbent 5 does not occur. Further, according to this configuration, since the exhaust gas does not flows through the HC adsorbent 5 during the normal operation of the engine, the back pressure of the exhaust gas during the normal operation of the engine can be reduced.

As explained above, according to the present invention, the HC discharged from the engine during its starting operation can be purified effectively and, thereby, the diffusion of HC into the atmosphere can be prevented.

We claim:

1. A method for purifying exhaust gas of an internal combustion engine including steps of:

providing HC adsorbing means in an exhaust gas passage of an internal combustion engine, wherein the HC absorbing means adsorbs hydrocarbons in the exhaust gas when a temperature of the HC adsorbing means is lower than a predetermined releasing temperature, and the HC adsorbing means releases the adsorbed hydrocarbons when the temperature of the HC adsorbing means is higher than the predetermined releasing temperature;

providing exhaust gas purifying means for oxidizing hydrocarbons in the exhaust gas in the exhaust gas passage downstream of the HC adsorbing means, wherein the exhaust gas purifying means is provided with an $O_2$ storage capability which enables the exhaust gas purifying means to absorb oxygen in the exhaust gas flowing into the exhaust gas purifying means when the air-fuel ratio of the exhaust gas is higher than a stoichiometric air-fuel ratio, and to release the absorbed oxygen when the air-fuel ratio of the exhaust gas is lower than the stoichiometric air-fuel ratio;

supplying the exhaust gas of the engine to the HC adsorbing means so that the HC adsorbing means adsorbs hydrocarbons in the exhaust gas during a starting up period of the engine in which the exhaust gas temperature is lower than the predetermined releasing temperature, and so that the HC adsorbing means releases the adsorbed hydrocarbons when the temperature of the exhaust gas becomes higher than the predetermined releasing temperature;

causing, during a starting operation of the engine, the exhaust gas purifying means to adsorb oxygen before the hydrocarbons are released from the HC adsorbing means by supplying exhaust gas having an air-fuel ratio higher than the stoichiometric air-fuel ratio to the exhaust gas purifying means; and supplying the exhaust gas through the HC adsorbing means to the exhaust gas purifying means so that, when the adsorbed hydrocarbons are released from the HC adsorbing means, the air-fuel ratio of the exhaust gas flowing into the exhaust gas purifying means becomes lower than the stoichiometric air-fuel ratio, and thereby the absorbed oxygen is released from the exhaust gas purifying means and reacts with the hydrocarbons in the exhaust gas on the exhaust gas purifying means.

2. A method for purifying exhaust gas as set forth in claim 1, wherein the exhaust gas purifying means is caused to absorb oxygen by introducing secondary air into the exhaust.

3. A method for purifying exhaust gas of an internal combustion engine including steps of:

providing HC adsorbing means in an exhaust gas passage of an internal combustion engine, wherein the HC adsorbing means adsorbs hydrocarbons in the exhaust gas when a temperature of the HC adsorbing means is lower than a predetermined releasing temperature, and the HC adsorbing means releases the adsorbed hydrocarbons when the temperature of the HC adsorbing means is higher than the predetermined releasing temperature;

providing exhaust gas purifying means for oxidizing hydrocarbons in the exhaust gas in the exhaust gas passage downstream of the HC adsorbing means, wherein the exhaust gas purifying means is provided with an $O_2$ storage capability which enables the exhaust gas purifying means to absorb oxygen in the exhaust gas flowing into the exhaust gas purifying means when the air-fuel ratio of the exhaust gas is higher than a stoichiometric air-fuel ratio, and to release the absorbed oxygen when the air-fuel ratio of the exhaust gas is lower than the stoichiometric air-fuel ratio;

supplying the exhaust gas of the engine to the HC adsorbing means so that the HC adsorbing means adsorbs hydrocarbons in the exhaust gas during a starting up period of the engine in which the exhaust gas temperature is lower than the predetermined releasing temperature, and so that the HC adsorbing means releases the adsorbed hydrocarbons when the temperature of the exhaust gas becomes higher than the predetermined releasing temperature;

causing, during a stop operation of the engine, the exhaust gas purifying means to absorb oxygen before the hydrocarbons are released from the HC adsorbing means by supplying exhaust gas having an air-fuel ratio higher than the stoichiometric air-fuel ratio to the exhaust gas purifying means; and supplying the exhaust gas through the HC adsorbing means to the exhaust gas purifying means so that, when the adsorbed hydrocarbons are released from the HC adsorbing means, the air-fuel ratio of the exhaust gas flowing into the exhaust gas purifying means becomes lower than the stoichiometric air-fuel ratio, and thereby the absorbed oxygen is released from the exhaust gas purifying means and reacts with the hydrocarbons in the exhaust gas on the exhaust gas purifying means.

4. A method for purifying exhaust gas of an internal combustion engine including steps of:

providing HC adsorbing means in an exhaust gas passage of an internal combustion engine, wherein the HC adsorbing means adsorbs hydrocarbons in the exhaust gas when a temperature of the HC adsorbing means is lower than a predetermined releasing temperature, and the HC adsorbing means releases the adsorbed hydrocarbons when the temperature of the HC adsorbing means is higher than the predetermined releasing temperature;

providing exhaust gas purifying means for oxidizing hydrocarbons in the exhaust gas in the exhaust gas passage downstream of the HC adsorbing means, wherein the exhaust gas purifying means is provided with an $O_2$ storage capability which enables the exhaust gas purifying means to absorb oxygen in the exhaust gas flowing into the exhaust gas purifying means when the air-fuel ratio of the exhaust gas is higher than a stoichiometric air-fuel ratio, and to release the absorbed oxygen when the air-fuel ratio of the exhaust gas is lower than the stoichiometric air-fuel ratio;

supplying the exhaust gas of the engine to the HC adsorbing means so that the HC adsorbing means adsorbs hydrocarbons in the exhaust gas during a starting up period of the engine in which the exhaust gas temperature is lower than the predetermined releasing temperature, and so that the HC adsorbing means releases the adsorbed hydrocarbons when the temperature of the exhaust gas becomes higher than the predetermined releasing temperature;

causing, after the engine has stopped, the exhaust gas purifying means to absorb oxygen before the hydrocarbons are released from the HC adsorbing means by supplying exhaust gas having an air-fuel ratio higher than the stoichiometric air-fuel ratio to the exhaust gas purifying means; and supplying the exhaust gas through the HC adsorbing means to the exhaust gas purifying means so that, when the adsorbed hydrocarbons are released from the HC adsorbing means, the air-fuel ratio of the exhaust, gas flowing into the exhaust gas purifying means becomes lower than the stoichiometric air-fuel ratio, and thereby the absorbed oxygen is released from the exhaust gas purifying means and reacts with the hydrocarbons in the exhaust gas on the exhaust gas purifying means.

5. A device for purifying exhaust gas of an internal combustion engine comprising:

an HC adsorbent disposed in an exhaust gas passage of the engine, wherein the HC adsorbent adsorbs hydrocarbons in the exhaust gas when a temperature of the HC adsorbent is lower than a predetermined releasing temperature, and the HC adsorbent releases the adsorbed hydrocarbons when the temperature of the HC adsorbent is higher than the predetermined releasing temperature;

an exhaust gas purifying catalyst disposed in the exhaust gas passage downstream of the HC adsorbent, wherein the catalyst is provided with an $O_2$ storage capability which enables the catalyst to absorb oxygen in the exhaust gas flowing into the catalyst when the air-fuel ratio of the exhaust gas is higher than a stoichiometric air-fuel ratio, and to release the absorbed oxygen when the air-fuel ratio of the exhaust gas is lower than the stoichiometric air-fuel ratio; and $O_2$ storage control means for causing, during a starting operation of the engine, the catalyst to absorb oxygen by adjusting the air-fuel ratio of the exhaust gas flowing into the catalyst to a value higher than a stoichiometric air-fuel ratio;

wherein the $O_2$ storage control means causes the catalyst to absorb oxygen before the hydrocarbons adsorbed in the HC adsorbent during a low exhaust gas temperature period following a start of the engine are released due to a temperature rise of the exhaust gas, thereby, when the hydrocarbons released from the HC adsorbent flow into the catalyst, the adsorbed oxygen is released from the catalyst to react with the released hydrocarbons on the catalyst.

6. A method for purifying exhaust gas as set forth in claim 5, wherein the $O_2$ storage control means adjusts the air-fuel ratio of the exhaust gas flowing into the exhaust gas purifying catalyst to a value higher than the stoichiometric air-fuel ratio by operating the engine at an air-fuel ratio higher than the stoichiometric air-fuel ratio.

7. A device for purifying exhaust gas as set forth in claim 5, wherein the $O_2$ storage control means adjusts the air-fuel ratio of the exhaust gas flowing into the exhaust gas purifying catalyst to a value higher than the stoichiometric air-fuel ratio by supplying air to the catalyst.

8. A device for purifying exhaust gas as set forth in claim 5, wherein the HC absorbent is further provided with the functions of an exhaust gas purifying catalyst having an $O_2$ storage capability.

9. A device for purifying exhaust gas as set forth in claim 5, wherein the catalyst is caused to absorb oxygen by introducing secondary air into the exhaust.

10. A device for purifying exhaust gas as set forth in claim 5, wherein the exhaust gas purifying catalyst is provided with heating means for heating the catalyst.

11. A device for purifying exhaust gas as set forth in claim 10, wherein the $O_2$ storage capability of the part of the exhaust gas purifying catalyst near the heating means is increased compared with other parts of the catalyst.

12. A device for purifying exhaust gas of an internal combustion engine comprising:

an HC adsorbent disposed in an exhaust gas passage of the engine, wherein the HC adsorbent adsorbs hydrocarbons in the exhaust gas when a temperature of the HC adsorbent is lower than a predetermined releasing temperature, and the HC adsorbent releases the adsorbed hydrocarbons when the temperature of the HC adsorbent is higher than the predetermined releasing temperature; and an exhaust gas purifying catalyst disposed in the exhaust gas passage downstream of the HC adsorbent, wherein the catalyst is provided with an $O_2$ storage capability which enables the catalyst to absorb oxygen in the exhaust gas flowing into the catalyst when the air-fuel ratio of the exhaust gas is higher than a stoichiometric air-fuel ratio, and to release the absorbed oxygen when the air-fuel ratio of the exhaust gas is lower than the stoichiometric air-fuel ratio; and $O_2$ storage control means for causing, during a stop operation of the engine, the exhaust gas purifying catalyst to absorb oxygen by adjusting the air-fuel ratio of the exhaust gas flowing into the catalyst to a value higher than a stoichiometric air-fuel ratio;

wherein the $O_2$ storage control means causes the catalyst to absorb oxygen before the hydrocarbons adsorbed in the HC adsorbent during a low exhaust gas temperature period following a start of the engine are released due to a temperature rise of the exhaust gas, thereby, when the hydrocarbons released from the HC adsorbent flow into the catalyst, the adsorbed oxygen is released from the catalyst to react with the released hydrocarbons on the catalyst.

13. A device for purifying exhaust gas as set forth in claim 12, wherein the $O_2$ storage control means adjusts the air-fuel ratio of the exhaust gas flowing into the exhaust gas purifying catalyst to a value higher than the stoichiometric air-fuel ratio by operating the engine at an air-fuel ratio higher than the stoichiometric air-fuel ratio.

14. A device for purifying exhaust gas as set forth in claim 12, wherein the $O_2$ storage control means adjusts the air-fuel ratio of the exhaust gas flowing into the exhaust gas purifying catalyst to a value higher than the stoichiometric air-fuel ratio by supplying air to the catalyst.

15. A device for purifying exhaust gas as set forth in claim 12, wherein the HC absorbent is further provided with the functions of an exhaust gas purifying catalyst having an $O_2$ storage capability.

16. A device for purifying exhaust gas of an internal combustion engine comprising:

an HC adsorbent disposed in an exhaust gas passage of the engine, wherein the HC adsorbent adsorbs hydrocarbons in the exhaust gas when a temperature of the HC adsorbent is lower than a predetermined releasing temperature, and the HC adsorbent releases the adsorbed hydrocarbons when the temperature of the HC adsorbent is higher than the predetermined releasing temperature; and an exhaust gas purifying catalyst disposed in the exhaust gas passage downstream of the HC adsorbent, wherein the catalyst is provided with an $O_2$ storage capability which enables the catalyst to absorb oxygen in the exhaust gas flowing into the catalyst when the air-fuel ratio of the exhaust gas is higher than a stoichiometric air-fuel ratio, and to release the absorbed oxygen when the air-fuel ratio of the exhaust gas is lower than the stoichiometric air-fuel ratio; and $O_2$ storage control means for causing, after the engine has stopped, the exhaust gas purifying catalyst to absorb oxygen by adjusting the air-fuel ratio of the exhaust gas flowing into the catalyst to a value higher than a stoichiometric air-fuel ratio;

wherein the $O_2$ storage control means causes the catalyst to absorb oxygen before the hydrocarbons adsorbed in the HC adsorbent during a low exhaust gas temperature period following a start of the engine are released due to a temperature rise of the exhaust gas, thereby, when the hydrocarbons released from the HC adsorbent flow into the catalyst, the adsorbed oxygen is released from the catalyst to react with the released hydrocarbons on the catalyst.

17. A device for purifying exhaust gas as set forth in claim 16, wherein the $O_2$ storage control means adjusts the air-fuel ratio of the exhaust gas flowing into the exhaust gas purifying catalyst to a value higher than the stoichiometric air-fuel ratio by supplying air to the catalyst.

18. A device for purifying exhaust gas as set forth in claim 10, wherein the HC absorbent is further provided with the functions of an exhaust gas purifying catalyst having an $O_2$ storage capability.

* * * * *

UNITED STATES PATENT AND TRADEMARK OFFICE
CERTIFICATE OF CORRECTION

PATENT NO. : 5,979,157
DATED : November 9, 1999
INVENTOR(S) : Yukio KINUGASA, et al.

It is certified that error appears in the above-identified patent and that said Letters Patent is hereby corrected as shown below:

Column 22, line 8, change "10" at beginning of line to --16--.

Signed and Sealed this

Eighth Day of May, 2001

*Attest:*

NICHOLAS P. GODICI

*Attesting Officer*   *Acting Director of the United States Patent and Trademark Office*